April 26, 1955     J. J. UNTERNÄHRER     2,706,920
ARRANGEMENT FOR DRIVING A CONICAL TOOL OUT
OF A CONICAL RECESS PROVIDED IN A CARRIER
HAVING A SLOT FOR DRIVING OUT THE TOOL
Filed Feb. 12, 1952
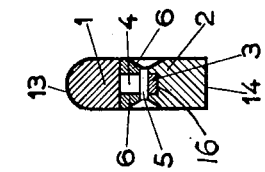
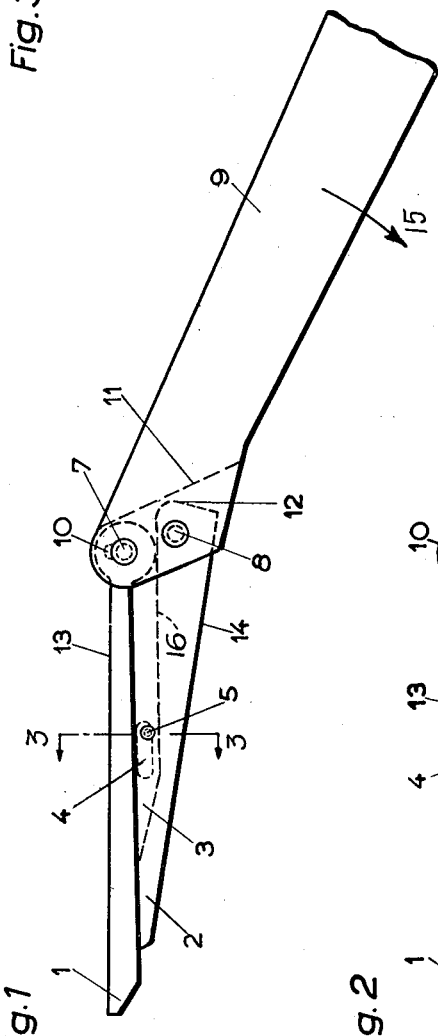
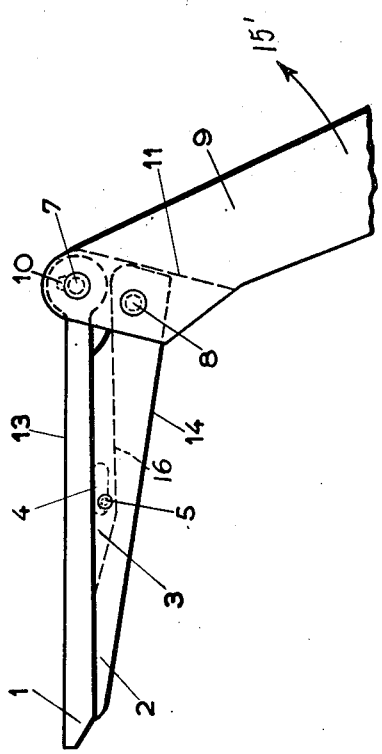
Inventor:
Jean Joseph Unternährer ated Apr. 26, 1955

2,706,920

ARRANGEMENT FOR DRIVING A CONICAL TOOL OUT OF A CONICAL RECESS PROVIDED IN A CARRIER HAVING A SLOT FOR DRIVING OUT THE TOOL

Jean J. Unternährer, Bitschwiller-les-Thann, France

Application February 12, 1952, Serial No. 271,131

Claims priority, application Switzerland February 16, 1951

4 Claims. (Cl. 81—3)

When it is desired to drive a conical tool out of a machine tool mandrel, there is generally used a wedge that is urged by hammering into the slot provided for this purpose in the mandrel. The hammering required in this case has a detrimental effect on the mandrel and on its bearings. In order to avoid the necessity of this hammering there have already been proposed arrangements for driving such conical tools out and, in particular, there have been proposed tongs with a rostriform or pointed tip adapted to be urged into the slot, for engagement with the tool, after which the tip is opened through a movement of the outer legs of the tongs towards each other. However, as the tong jaws should be comparatively small in size so as to be capable of entering the said slot, they are consequently not capable of meeting the stresses arising in operation. The same is the case for a different known device showing an expansible system of two bars arranged in wedge-shaped formation with reference to each other and between which is inserted a wedge which may be shifted longitudinally by means of a crank, an eccenter or a screw in order to open the bar system. These bars are thus submitted to similar unfavorable conditions as concerns their size, as was the case for the jaws of the above-mentioned tongs. Furthermore, this arrangement is comparatively complicated and includes a large number of parts.

Now the present invention has for its object to remove these drawbacks of the known arrangements and covers an arrangement for wedging a conical tool out of its conical recess provided in a tool carrier having a slot through which the tool may be driven out, said arrangement being characterized by the fact that there are provided two wedge-shaped parts adapted to slide longitudinally over each other, together with a system for controlling this relative shifting of the wedges. As in this case only two superposed wedges, in full contact with each other, need to be introduced into the slot, they may be sufficiently large so as to meet satisfactorily the largest stresses that may appear for driving the tool out.

Accompanying drawings show by way of example a preferred embodiment of the invention. In said drawings:

Figs. 1 and 2 are side views of the arrangement for different positions thereof;

Fig. 3 is a cross-section through line 3—3 of Fig. 1.

A wedge 1 is longitudinally shiftable over the wedge 2; said wedges have different angles of wedge and are positioned so as to face opposite directions; they are connected through a longitudinal slideway inasmuch as there is formed inside the wedge 2 on the side facing the wedge 1, a longitudinal groove 16 into which projects a guiding rib 3 formed on the corresponding side of the wedge 1. This guiding rib 3 is provided with a longitudinal slot 4 engaged by a stud 5 carried in the sides 6 of the groove in the wedge 2.

In the case of Figs. 1 and 2, the two wedges are each connected on the right hand side with a lever-shaped carrier 9, the connections being ensured respectively through the pivots 7 and 8 in a manner such that a rocking of the carrier 9 in the direction of either arrow produces a relative longitudinal movement of the two wedges. As, in this case, one of the pivots travels over an arc of a circle with reference to the other pivot, the recess 10 adapted to receive the pivot 7 forms a longitudinal opening in the wedge 1 so that the to and fro rocking of the carrier may produce no relative rising movement of one wedge with reference to the other, and, on the contrary, constrain the wedges to remain in full contacting engagement for all relative positions thereof. In order to improve the guiding, the carrier 9 forms a fork holding the ends of the wedges while the bottom 11 of the fork serves also as a stop for the terminal surface 12 of the wedge 2 and limits thus the relative travel of the two wedges.

In order to drive out a conical tool, the operator takes hold of the arrangement assuming the shape shown in Fig. 1 by engaging the carrier 9 with one hand and inserting the front ends of the two wedges 1 and 2 into the slot of the tool carrier from which the conical tool is to be driven out, the wedges being engaged until the back 13 of the wedge 1 is in contact with the bottom of the slot in the tool carrier and the back 14 of the wedge 2 engages the extension on the conical tool that serves for the driving out of the latter. This being done, the operator rocks the carrier 9 in the direction of the arrow 15 of Fig. 1 through a suitable pressure of his hand so as to produce a relative longitudinal shifting of the wedges 1 and 2 with reference to each other, whereby these wedges are shifted from the position of Fig. 1 into the position of Fig. 2, which results in a corresponding increase in the thickness of the associated wedges between the two wedge backs 13 and 14, as defined by the operative angles of the wedges and consequently, the conical tool is urged out of the tool carrier. If required, it is possible, in case the corresponding shifting of the conical tool is not sufficient for releasing the wedging action exerted thereon, to repeat once or several times the operation described and to this end, the carrier 9 is returned out of the position of Fig. 2 in the direction of the arrow 15' back into the position of Fig. 1, and, when in this latter position, the wedges 1 and 2 are again urged into the slot after which the carrier 9 is returned again into the position of Fig. 2 for operation.

Of course, the arrangement considered can also be used in those cases where the tool-carrier is no longer a machine-tool mandrel or chuck, but an intermediary reduction sleeve that is used in order to introduce a small conical tool into a machine tool mandrel having a comparatively large hollow conical recess.

The two surfaces facing each other on the two wedges should be preferably well ground so that they may easily slide over each other. The same is the case for the back 13 of the wedge 1 that is intended for sliding purposes with reference to the tool carrier.

What I claim is:

1. A device for driving a conical tool out of a tool holder carrying the said tool in a conical recess thereof and having a slot disposed behind the rear end of the said tool, the said slot being adapted to receive the said device, comprising two longitudinal tapered members, slidingly engaging each other, the taper of one of said members being disposed in opposite direction to that of the other of the said members, and means for sliding one of the said tapered members relative to the other of the said tapered members in order to increase the outer distance between the said two members and, thereby, to remove the said tool from the said tool holder, and longitudinal and lateral guide means disposed on the opposite faces of the said tapered members in order to guide one of the said members along the other of the said members.

2. A device for driving a conical tool out of a tool holder carrying the said tool in a conical recess thereof and having a slot disposed behind the rear end of the said tool, the said slot being adapted to receive the said device, comprising two longitudinal tapered members, slidingly engaging each other, the taper of one of said members being disposed in opposite direction to that of the other of the said members, and means for sliding one of the said tapered members relative to the other of the said tapered members in order to increase the outer distance between the said two members and, thereby, to remove the said tool from the said tool holder, and longitudinal guide means disposed on the opposite faces of the said tapered members in order to guide one of the said members along the other of the said members, the said guide means comprising a longitudinal groove disposed in one of the opposite faces of one of the said tapered members and a projection complementary to said groove on the face of the other of the said tapered members, the said projection to be received by the said groove.

3. A device for driving a conical tool out of a tool holder carrying the said tool in a conical recess thereof and having a slot disposed behind the rear end of the said tool, the said slot being adapted to receive the said device, comprising two longitudinal tapered members, slidingly engaging each other, the taper of one of said members being disposed in opposite direction to that of the other of the said members, and means for sliding one of the said tapered members relative to the other of the said tapered members in order to increase the outer distance between the said two members and, thereby, to remove the said tool from the said tool holder, and a guiding rib disposed longitudinally on the face of one of the tapered members engaging the opposite face of the other of the said tapered members, the said guiding rib having a longitudinal slot, a longitudinal groove disposed in the face of the other of the said tapered members and a stud rigidly secured to at least one of the sides of the said longitudinal groove and adapted to engage slidingly the said slot of the guiding rib of the said one tapered member.

4. A device for driving a conical tool out of a tool holder carrying the said tool in a conical recess thereof and having a slot disposed behind the rear end of the said tool, the said slot being adapted to receive the said device, comprising two longitudinal tapered members, slidingly engaging each other, the taper of one of said members being disposed in opposite direction to that of the other of the said members, and longitudinal and lateral guide means disposed on the opposite faces of the said tapered members in order to guide one of the said tapered members along the other of the said tapered members and, thereby, to increase the outer distance between the said two members and to remove the said tool from the said tool holder, and a lever-shaped carrier, one end of each of the said tapered members being pivotally secured to one end of the said carrier so that upon turning of the said carrier upon the said pivot of one of the said tapered members, the other of the said tapered members is moved relative to the said one of the said tapered members.

References Cited in the file of this patent

UNITED STATES PATENTS

| 129,412 | Jackson | July 16, 1872 |

FOREIGN PATENTS

| 345,470 | Germany | Dec. 10, 1921 |